United States Patent [19]
Ratner et al.

[11] 3,939,049
[45] Feb. 17, 1976

[54] PROCESS FOR RADIATION GRAFTING HYDROGELS ONTO ORGANIC POLYMERIC SUBSTRATES

[75] Inventors: Buddy D. Ratner; Allan S. Hoffman, both of Seattle, Wash.

[73] Assignee: The United States of America as represented by the United States Energy Research and Development Administration, Washington, D.C.

[22] Filed: Apr. 10, 1974

[21] Appl. No.: 459,734

[52] U.S. Cl. . 204/159.13; 204/159.15; 204/159.17; 260/75 T; 260/824 R; 260/859 R; 260/873; 260/881; 260/884; 260/885
[51] Int. Cl.$^2$. C08F 2/46; C08L 43/04; C08L 83/10
[58] Field of Search..... 204/159.15, 159.16, 159.17, 204/159.13

[56] References Cited
UNITED STATES PATENTS

| | | | |
|---|---|---|---|
| 3,008,920 | 11/1961 | Urchick | 204/159.15 X |
| 3,639,524 | 2/1972 | Seiderman | 260/885 |
| 3,706,573 | 10/1972 | Laizier et al. | 204/159.13 |

OTHER PUBLICATIONS

O'Neill, Thomas Grafting of Acrylic Acid onto Radiation–Peroxidized Polypropylene Film in Presence of $Fe^{++}$, JDPS PT.A–1, Vol. 10, pp. 569–580 (1972).

Primary Examiner—Murray Tillman
Assistant Examiner—Thurman K. Page
Attorney, Agent, or Firm—Robert M. Poteat

[57] ABSTRACT

An improved process for radiation grafting of hydrogels onto organic polymeric substrates is provided comprising the steps of incorporating an effective amount of cupric or ferric ions in an aqueous graft solution consisting of N-vinyl-2 - pyrrolidone or mixture of N-vinyl-2 - pyrrolidone and other monomers, e.g., 2-hydroxyethyl methacrylate, 2-hydroxyethyl acrylate, propylene glycol acrylate, acrylamide, methacrylic acid and methacrylamide, immersing an organic polymeric substrate in the aqueous graft solution and thereafter subjecting the contacted substrate with ionizing radiation.

7 Claims, 4 Drawing Figures

PROCESS FOR RADIATION GRAFTING HYDROGELS ONTO ORGANIC POLYMERIC SUBSTRATES

BACKGROUND OF THE INVENTION

The invention described herein was made in the course of, or under, a contract with the United States Atomic Energy Commission. This invention relates to a method of grafting hydrogels to polymeric substrates.

A number of promising materials have been developed for biomedical applications. Hydrogels, which are water-swollen polymeric gels, are of interest; because of their highly hydrated polymer networks, hydrogels have excellent compatibility with body fluids and are desirable for use in prosthetic devices, such as heart valve, poppets, catheters, intrauterine devices and power pack coverings for heart assist devices. The hydrogels are, however, physically weak and, to be of practical utility, must be bonded to a substrate. Substrates which have heretofore been investigated as supports of hydrogels include, for example, silicone rubber or other of the well known organic polymeric materials, e.g., polyurethane, polyvinyl chloride, polyurethane-polyether co-polymers, etc.

Radiation grafting has been widely employed as a method of bonding the hydrogels to organic polymeric substrates and generally includes the steps of immersing the substrate in an aqueous solution of a grafting monomer and thereafter subjecting the immersed substrate to ionizing radiation, such as, for example, gamma radiation from a cobalt-60 source. After irradiation for a specified period of time, the now grafted polymer film is removed from the surrounding medium (hereinafter referred to as either the "external" polymer or "external" solution) and cleaned. The surrounding medium, at this point, generally consists of polymer, unreacted monomer and solvent. Depending upon the precise conditions, the medium could be fully liquid, a tough, crosslinked gel or some combination of liquid and gel.

While we have used the word "monomer" in the singular in the above discussion, two or more monomers can be used, so that the hydrogel is a co-polymer. Co-polymers of N-vinyl-2 - pyrrolidone with, for example, 2-hydroxyethyl methacrylate (HEMA) or 2-hydroxyethyl acrylate, produce highly desirable graft polymers on silicone rubber or other substrates. The co-polymers may be lightly crosslinked by, for example, small proportions of ethylene glycol dimethacrylate (EGDMA). Not only is the product biocompatible in itself but it can be chemically bonded to biologically active molecules, e.g. protein molecules, to provide excellent biocompatible, biofunctional surfaces. U.S. patent application Ser. No. 260,237 filed June 6, 1972 in the names of Allan S. Hoffman and Gottfried Schmer discloses a method of producing such a biocompatible, biofunctional material.

It is highly desirable that the grafting system comprises a nongelling (liquid) external polymer. Such a system allows the rapid, reproducible preparation of evenly grafted films as well as ensures that a high degree of graft takes place. Thus, under optimum conditions the hydrogel layer or film will be grafted to the substrate and the grafting system will remain liquid to facilitate removal of the grafted sheet. Unfortunately, radiation grafting processes require very precise control of the governing parameters such as type substrate and monomers, radiation dose, presence or absence of catalysts, etc.

It is an object of our invention to provide an improved method of grafting hydrogels to an organic polymeric substrate. Another object is to provide a method for radiation grafting hydrogels to organic polymeric substrates wherein a high degree of grafting is achieved while maintaining a non-gelling external polymer.

SUMMARY OF THE INVENTION

These objects and others which will be apparent to those skilled in the art are achieved by incorporating an effective amount of cupric or ferric ions in an aqueous grafting solution consisting of N-vinyl-2-pyrrolidone (N-VP) or mixtures of N-vinyl-2 - pyrrolidone and other monomers, e.g., 2-hydroxyethyl methacrylate or 2-hydroxyethyl acrylate, propylene glycol acrylate, acrylamide, methacrylic acid acrylic acid and methacrylamide, immersing a suitable organic polymeric substrate in the aqueous graft solution and thereafter subjecting the contacted substrate to ionizing radiation. Cupric or ferric ions in concentrations within the range of 0.0008M to 0.0016M were found to markedly improve the degree of graft onto organic polymeric substrates as compared to graft monomer solutions alone, while retaining a liquid external polymer or soft gel. Where the graft formulation consists of N-vinyl-2 - pyrrolidone in combination with other monomers (e.g., 2-hydroxyethyl methacrylate (HEMA) 2-hydroxyethyl acrylate (HEA), cupric or ferric ions were found to synergisticly increase the graft obtainable on the polymeric substrate.

The present invention affords wider flexibility in selection of polymeric substrates and range of monomers while achieving greater reproducibility for radiation graft formulations and higher degree of grafts. The residual metal ion contents in the finished, washed, grafted films was below the limits of detection, i.e., less than 10 ppm. In biomedical applications metal ion contents of about 10 ppm. would appear to have insignificant effects.

DESCRIPTION OF THE PREFERRED EMBODIMENTS

Figure 1:
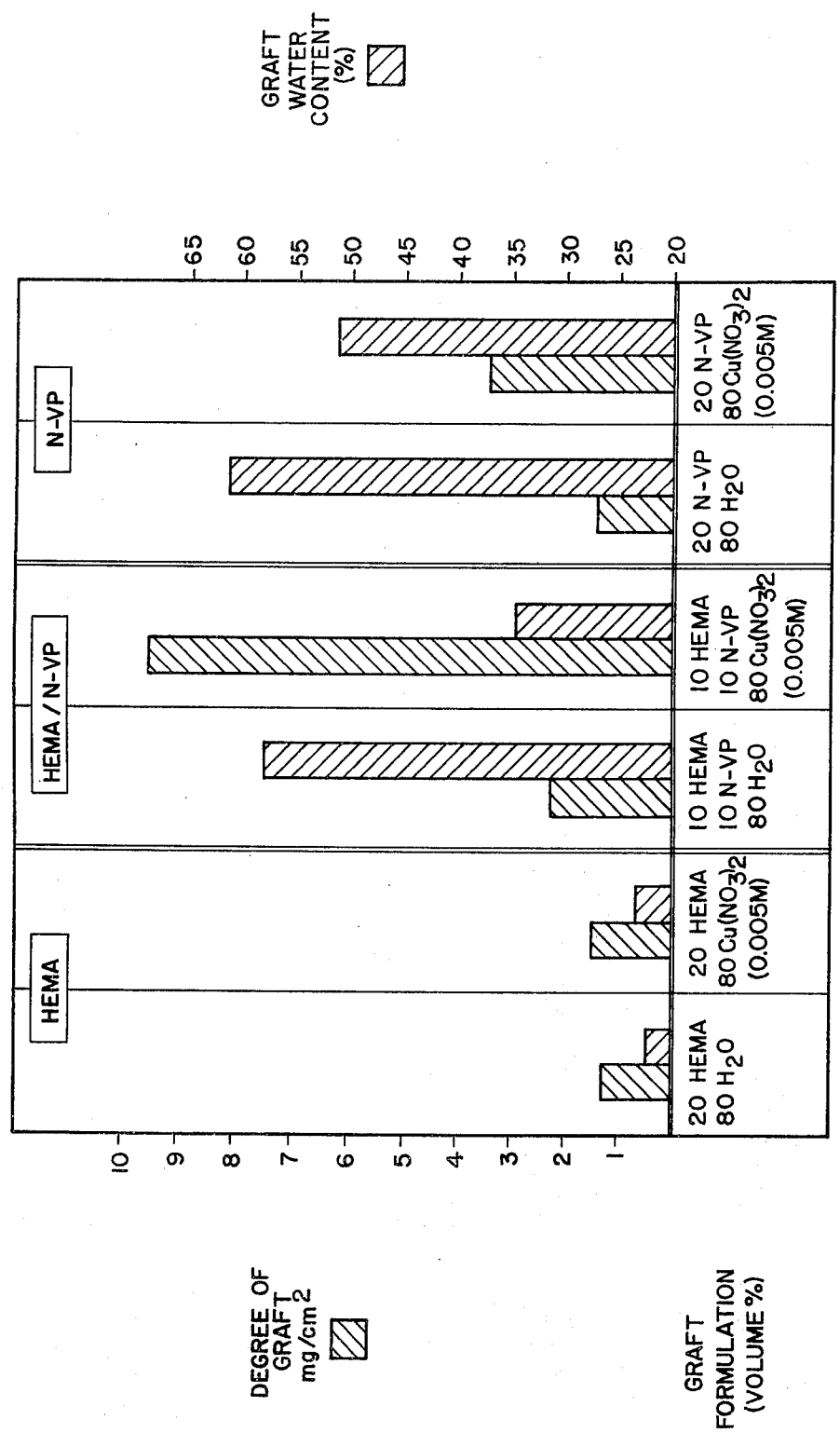
FIG. 1 is a bar graph showing the differences in grafting behavior of various monomer systems with and without cupric nitrate in the solvent.

In order to obtain the high graft levels together with a liquid external polymer characteristic of this invention, it is necessary that the monomer mixture contain N-vinyl-2 - pyrrolidone (N-VP). The proportions of N-vinyl-2 - pyrrolidone in the monomer mixture may vary widely. As little as one part in twenty of N-vinyl-2 - pyrrolidone in the monomer mixture has been found to produce a synergistic effect on the degree of grafting as compared to when other monomers are used alone; high graft values are obtained up to about eighteen parts in twenty of N-vinyl-2 - pyrrolidone, with a maximum at an intermediate point. At proportions higher than eighteen in twenty the amount of graft falls off rapidly. The properties of the graft layer also vary with the proportion of N-vinyl-2 - pyrrolidone. The higher the proportion, the higher the proportion of water in the graft layer which for biocompatibility should be at least 30%. The selection of the proportions will, therefore, depend on the properties desired in a particular situation.

The incorporation of an effective amount of cupric or ferric ions in the graft formulations has been found to produce a dramatic increase in the degree of graft while giving a liquid external polymer or soft gel which is easily removed from the graft material. Graft formulations in accordance with the invention incorporate as an effective amount of cupric or ferric ions concentration (based on salt additions) in the range of from 0.00032M to 0.008M and preferably 0.008M to 0.0016M. The concentration of the copper or iron salts may be expressed in two ways, either the concentration based on the solvent (water) alone or that based on the entire solution (water plus monomer). The latter is more fundamental, particularly when considering different monomer concentrations which, may range from 4 to 40%. When working at a single total monomer concentration, which is most commonly 20% by weight, it is often most convenient to base the salt concentration on the solvent (water) alone and some of the data given in this specification are reported on this basis. It is a simple matter to convert data from one basis to the other.

The cupric or ferric ions may conveniently be provided in the graft formulations by the addition of reagent grade soluble metal salts such as cupric nitrate, cupric chloride, cupric sulfate, cupric acetate, ferric nitrate, etc.

Unlike previous graft formulations the presence of cupric or ferric ions in the present graft formulations enables a wider latitude in selection of the organic polymeric substrates. Hence, any of the well known support organic polymeric materials such as silicone rubber (polyalkyl siloxane), polyurethane, polyurethane-polyether copolymers, polyvinylchloride, etc., may be used in the present process. It should be noted that the presence of cupric or ferric ions in the graft formulations provided no appreciable increase in grafting where polyethylene was employed as the organic polymeric substrate as was found for other substrates such as silicone rubber, polyurethane-polyether copolymers, etc. It is postulated that this anomalous behavior is due to the lack of swelling and concomitant penetration of the graft monomers, e.g., N-VP and HEMA, of the highly crystalline polyethylene matrix. With polyethylene, grafting can occur only at the surface of the substrate where it is subject to inhibition by the cupric or ferric ions. For those organic polymeric substrates which will not swell in contact with the grafting monomers, such as polyethylene, a few percent (e.g., up to about 20%) of a miscible solvent which would swell the organic polymeric substrate should be added to the total grafting monomer mixture. While neither N-VP or HEMA will swell polyethylene, decalin in emulsion with the cupric nitrate aqueous solution will and may be used where the organic polymeric substrate is polyethylene or other highly crystalline matrix polymeric materials such as polyesters (e.g., Dacron and Mylar).

Of equal importance is the wider range of monomers which can now be used in radiation grafting. While reports have previously indicated that acrylamide may be highly thromboresistant, reasonable acrylamide graft levels could not heretofore be achieved with low radiation doses. Graft formulations, however, containing cupric or ferric ions, now can be employed to radiation graft acrylamide coatings to organic polymeric substrates.

In carrying out the radiation grafting the organic polymeric substrate is first immersed in the monomer-salt solution, such as a mixture of N-vinyl-2 - pyrrolidone, 2-hydroxyethyl methacrylate and cupric or ferric ions and then subjected to ionizing irradiation. While other forms of ionizing radiation, e.g., electron beam irradiation, may be used to effect the radiation grafting, gamma radiation by a cobalt-60 source is quite satisfactory. Doses from 0.1 Mrad – 0.38 Mrad may be employed with 0.25 Mrad ($0.25 \times 10^6$ rads) being quite suitable. No advantage is achieved at doses above about 0.5 Mrad and those below 0.1 Mrad will not give any graft. The radiation grafting step is preferably conducted at room temperature and no special precautions need be taken at this stage of the process. The substrate may, for example, be immersed in the monomer-salt solution in an open container without any protective atmosphere. It is one of the advantages of the present invention that the irradiation can be effected with a small dose which does not damage the polymeric substrate.

The metal ion content in the finished, washed, grafted films was below the lowest limits of sensitivity of standard laboratory instruments. Typical values for finished graft films are given in Table I below.

TABLE I

| Monomer System (Vol. %) | $Cu^+$ in Finished Films | | |
|---|---|---|---|
| | $Cu(NO_3)_2$ | $H_{Analysis}$ | |
| 10-HEMA, 10-N-VP | 80% | (0.005) | <3 ppm |
| 16-HEMA, 4-N-VP | 80% | (0.002) | <10 ppm |
| 16-HEMA, 4-N-VP | 80% | (0.01) | <10 ppm |
| 16-HEMA, 4-N-VP | 80% | (0.05) | <10 ppm |

Having described the invention in general fashion the following examples are given to indicate with greater particularity the process parameters and techniques.

EXAMPLE 1

A series of radiation grafts were prepared using non-reinforced, 10 mil Silastic film (registered trademark with the Dow Corning Corporation) as the organic polymeric substrate and grafting formulations consisting of aqueous solutions of monomers of N-vinyl-2 - pyrrolidone (N-VP), 2-hydroxyethyl methacrylate (HEMA) and mixtures thereof. Cupric nitrate (0.004M based on total concentration in grafting solution) was added to half of the graft formulations. The HEMA monomer had a diester level of 0.02% and a methacrylic acid level of 0.02%. The N-VP monomer was purified by drying over Drierite and distilled at 42°C and a pressure of 1 mm Hg.

The thin Dow Corning Silastic films were washed for 5 minutes in 0.1% Ivory soap solution in an ultrasonic cleaner. They were subsequently given three 5 -minute rinses in freshly changed distilled water in the ultrasonic cleaner. The films were stored in a chamber at a relative humidity of 52%.

The cleaned Silastic films were suspended for about 1 hour in monomer solutions without removal of air, and irradiated in a ca. 20,000 curie cobalt-60 source for about 84 minutes. The radiation does used in all experiments was 0.25 Mrad.

After grafting, the films were removed from the bulk external polymer. Adhering bulk polymer (if any) was cleaned by vigorous rubbing with a sponge soaked in a mixture of acetone and water in equal proportions. The films were then thoroughly washed in two stirred acetone-water baths and four distilled water baths over a 24-hour period.

Water contents of the grafted films were measured by blotting the films between two sheets of Whatman No. 1 filter paper for ten seconds using a 300 g. weight to insure even, reproducible pressure and then weighing immediately. Percent water in the graft was calculated using the relationship $$\frac{W_w - W_d}{W_w - W_s} \times 100 = \% H_2O$$

where $W_w$ is the weight of the wet, grafted film, $W_d$ is the weight of the grafted film dried in a dessicator over anhydrone at 1mm. Hg. for 24 hours, and $W_s$ is the weight of the untreated Silastic film. Reported water contents are the average of at least two determinations.

The weight of the graft per area ($W_g$) was obtained using the following relationship $$W_g = \frac{W_d - W_s}{\text{initial film area}}$$

Scanning electron micrographs were taken on a Cambridge stored scan instrument. Prior to examination the grafted hydrogels were dried and coated with a vacuum deposited layer of carbon and then gold and platinum. The results are given in Table II and shown as a bar graph in FIG. 1.

First, the monomer solution was not deoxygenated. As there was no control on how much oxygen was dissolved in solution the polymerization induction period, and therefore the final amount of graft, varied. Second, changes in the manufacturing procedure, and perhaps in the composition of the Silastic silicone rubber, were periodically made by the manufacturer. Those changes were often obvious as the appearance of the material was clearly different from one batch to another. Direct comparisons showed that different rubber batches grafted different amounts of hydrogel under otherwise identical conditions. Still, for a series of films grafted at the same time onto the same Silastic batch trends were always reproduced perfectly although the absolute magnitude of the effects noted might vary 0–20%. All points on any of the curves presented in the figures were derived from experiments run at the same time with the same Silastic batch. Where more than one curve is presented in a given figure, cross checks were read to be certain their relative placement with respect to the magnitude of the graft is correct. Water content measurements were never found to vary more than 5% between experiments.

EXAMPLE 2

The experiments of Example 1 were repeated using cupric chloride instead of cupric nitrate. The results were identical within the limits of experimental error. It was therefore concluded that the observed effects were due to the cation rather than the anion.

EXAMPLE 4

Figure 2:
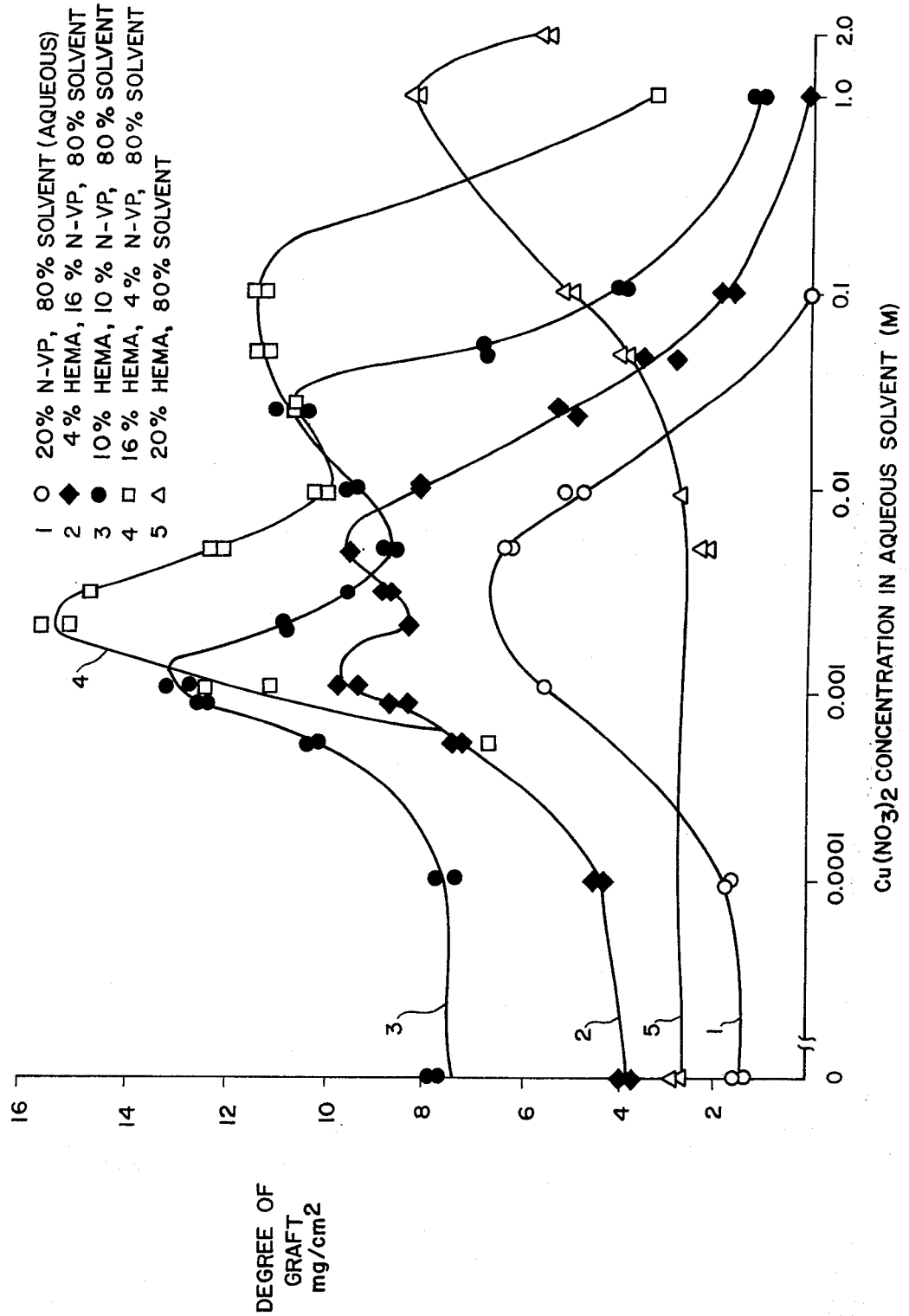
FIG. 2 is a semilogarithmic graph showing the effect of cupric nitrate concentrations in the solvent on the degree of graft for various monomer systems.

The previous experiments utilized only a single salt concentration and only single monomers or equal amounts of N-VP and HEMA. In order to further develop the process, a series of experiments were carried out in which the proportions of monomers and salt were varied. Results are shown in FIG. 2.

In considering this figure in detail, several points should be noted. First, all solutions had a total monomer content of 20% by volume. Second, the salt concentrations are plotted on a logarithmic scale while the degree of graft is plotted on a linear scale. Third, the

TABLE II

| Monomer system (Vol. %)[a] | $Cu^{++}$ Concentration[a] | Graft mg/cm[2] | Graft % $H_2O$ | Description of External Polymer |
|---|---|---|---|---|
| 20-HEMA | 0 | 1.12 | 22.1 | white gel |
| 20-HEMA | 0.005M | 1.39 | 23.0 | white gel |
| 10-HEMA, 10 N-VP | 0 | 2.73 | 57.6 | white gel |
| 10-HEMA, 10 N-VP | 0.005M | 9.74 | 34.5 | fully liquid |
| 20-N-VP | 0 | 1.40 | 60.9 | high viscosity liquid |
| 20-N-VP | 0.005M | 3.41 | 50.5 | low viscosity liquid |

[a]Based on total solution.
All monomers contained 1% by volume ethylene glycol dimethacrylate (EGDMA) based on total monomer content.

It will be observed that when both monomers and $Cu(NO_3)_2$ were present as compared to any other system the graft obtained was very high, e.g., 9.74 mg/cm[2] to 2.73 mg/cm[2]. Also, the external polymer was fully liquid under these conditions. While the water content of the graft was reduced as compared to the same monomer system without the copper addition it was still above 30% which is perhaps the lower limit for use as biocompatible surfaces.

Between grafting experiments run on different days there might be a variation in the degree of grafting of about 20%. The variation was attributed to two factors.

salt concentrations are based on the solvent (water). To obtain the concentrations based on the entire solution, the plotted values are multiplied by 0.8.

In this figure curves 1, 2, 3, 4 and 5 show the results with successively greater proportions of HEMA in the monomer mixture.

Specifically, curve 1 shows the results with 20% by volume N-VP in the total solution and no HEMA.

Curve 2 shows the results for 16% N-VP and 4% HEMA.

Curve 3 shows the results for 10% N-VP and 10% HEMA.

Curve 4 shows the results for 4% N-VP and 16% HEMA.

Curve 5 shows the results for no N-VP and 20% HEMA.

Figure 3:
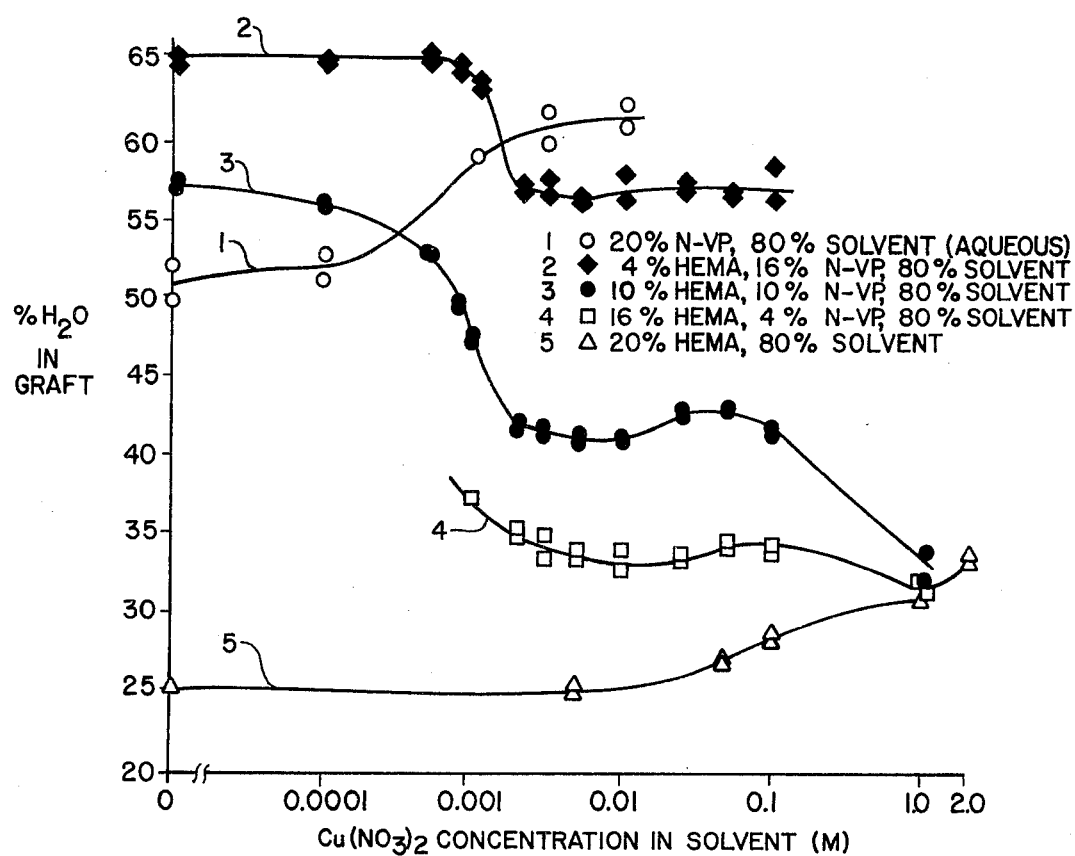
FIG. 3 is a semilogarithmic graph showing the effect of cupric nitrate concentration in the solvent on the water content in the graft for various monomer systems.

FIG. 3 shows the water content of the graft layers on Silastic silicone rubber obtained with different proportions of monomer and salt. The numbered curves refer to systems having the same composition as the curves in FIG. 2 having the same reference numerals.

It will be noted from FIG. 2 that all the compositions except those containing HEMA as the only monomer showed a high graft in the region in which the copper salt concentration based on the solvent is somewhere between 0.0004M (0.0032M based on the entire solution) and 0.01M (0.008M based on the entire solution) and 0.002M (0.0016M based on the entire solution). The latter therefore consitutes our preferred range.

As has been noted above, the character of the external polymer, i.e., the bulk solution, is important. This property has been found to vary with the monomer composition and the salt concentrates. For systems containing, by volume, 16% N-VP and 4% HEMA and 20% N-VP, no HEMA (FIG. 2, curves 1 and 2) the external polymer was completely liquid at all copper concentrations. However, with cupric nitrate concentrations of 0.0008M or lower (based on the entire solution), the solution had a "molasses-like" viscosity while at higher concentrations it had a viscosity which might be described as "water-like." For the system of curve 4, i.e., 4% N-VP, 16% HEMA, copper salt concentrations of less than about 0.0008M (based on the entire solution), the external gel was so intractable that it could not be separated from the grafted film. At increasing copper concentrations the gel gradually become softer and at 0.0016M the external polymer was entirely liquid. When both monomers were present in equal quantities (FIG. 3, curve 3) a soft, white gel which could be easily peeled from the Silastic sheet carrying the graft coating was found when the cupric nitrate concentration was below 0.0008M (based on the entire solution). Above 0.0008M, a low viscosity liquid remained. For systems containing only HEMA, a liquid external polymer was found only when the cupric nitrate was 0.8M or above (based on the entire solution).

The surface properties of the graft layer also vary with the monomer proportions and the salt concentrations. In the low cupric nitrate regions the grated films were relatively wettable in water. When lifted from a vessel of water, the water will flow over and evenly coat such films. As the salt concentration is increased, the film becomes nonwettable, so that the water stands in drops. This change occurs at about the same concentration as the maximum graft. So far as is now known, this does not affect the biocompatibility of the material. At still higher concentrations, (above about 0.05M based in the entire solution) the surface takes on a reticulated or "orange peel" texture and cannot be readily evaluated for wettability.

EXAMPLE 5

Figure 4:
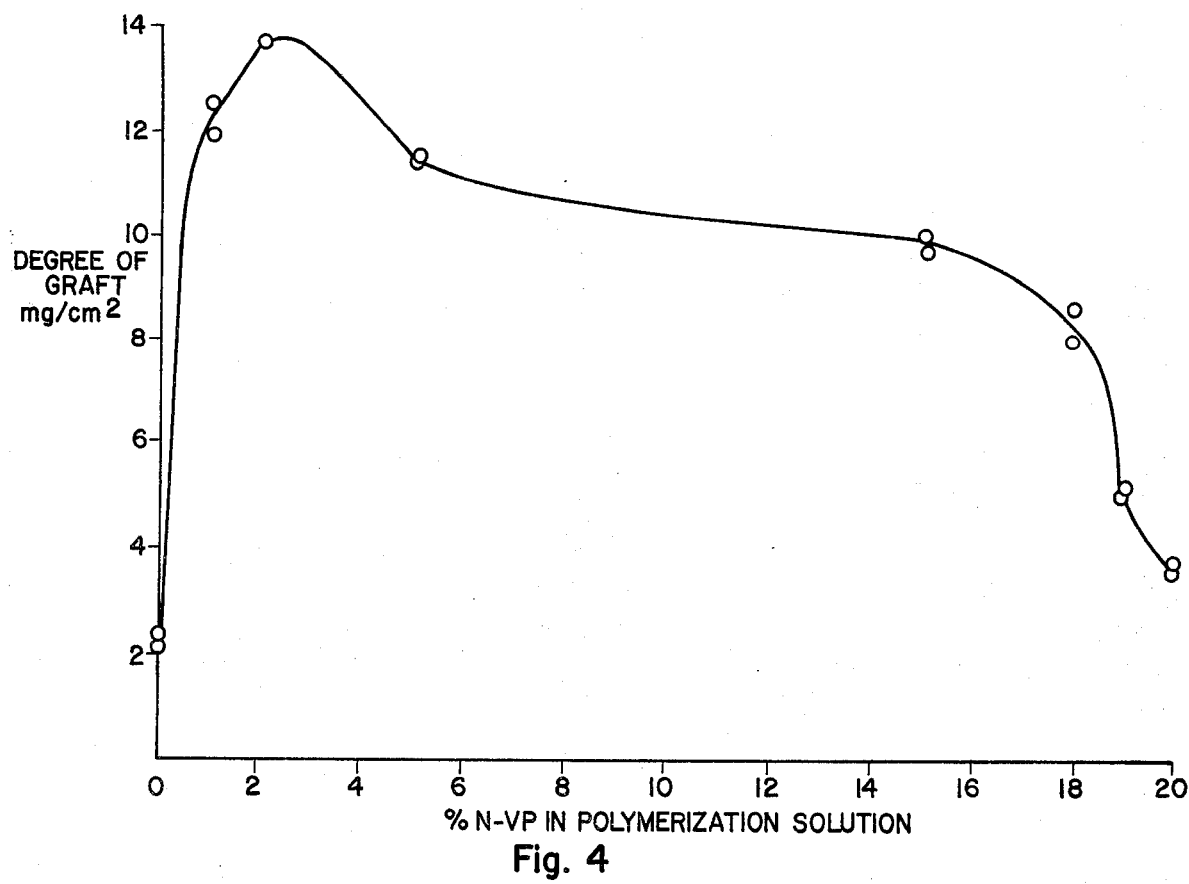
FIG. 4 is a plot of the degree of graft as a function of the volume percent N-VP in the monomer mixture for the system $(xN-VP + (20-x)$ HEMA + 80 $Cu(NO_3)_2$ (0.005M) = 100%.

As is apparent from the curves of FIg. 2, varying the proportions of the monomers materially affect the amount of graft, with the largest amount being obtained with 4% N-VP and 16% HEMA. A further investigation was made at a constant concentration of 0.005M cupric nitrate (based on the entire solution) with a larger selection of monomer proportions. The maximum graft was at 2% N-VP, 18% HEMA. At lower proportions of N-VP there was a rapid drop off of graft. At higher proportions there was a more gradual decrease, until a ratio of 18% N-VP, 2% HEMA was reached. On further increase in N-VP, there was again a rapid drop off. Results are plotted in FIG. 4.

EXAMPLE 6

In order to determine the effect of ferric salts on the graft, the experiments of Example 1 were repeated using ferric nitrate, $Fe(NO_3)_3$, rather than cupric nitrate. Results were much the same, except that the graft layer was stained yellow.

EXAMPLE 7

A series of experiments like those of Example 1 were run to determine the effect of cupric salts on various monomer combinations. The total monomer content of the aqueous solutions was 20 percent by volume. When two monomers were used, they were present in equal proportions except as otherwise noted. The copper salt was cupric nitrate.

Monomers used, in addition to N-VP were 2-hydroxyethyl acrylate (HEA), acrylamide (AAM), propylene glycol acrylate (PGA), methacrylic acid (MAAC), and methacrylamide (MAAM). Results are shown in Table III.

TABLE III

| Monomer System | $Cu^{++}$ Concentration[a] | Graft mg/cm$^2$ | Graft %H$_2$O | Remarks |
| --- | --- | --- | --- | --- |
| HEA - N-VP | 0 | 0 | — | External solution gelled |
| HEA - N-VP | .004M | 13.3 | 57.5 | — |
| AAM - N-VP | 0 | 0 | — | External solution gelled |
| AAM - N-VP | .004M | 2.5 | 60.2 | — |
| AAM - HEMA | 0 | 2.3 | 52.0 | — |
| AAM - HEMA | .004M | 2.7 | 46.3 | — |
| AAM | 0 | 0 | — | External polymer gelled |
| AAM | .004M | 1.3 | 65.0 | — |
| PGA - N-VP | 0 | 0 | — | External polymer gelled |
| PGA - N-VP | .004M | 9.6 | 50.2 | — |
| MAAC[b] -N-VP | 0 | 1.6 | 46.5 | External polymer gelled |
| MAAC[b] -N-VP | .004M | 3.9 | 57.0 | — |
| MAAM - N-VP | 0 | 8.1 | 62.9 | — |
| MAAM - N-VP | .004 | 4.2 | 60.5 | — |
| MAAM (5%) - N-VP (15%) | 0 | 6.8 | 66.2 | — |
| MAAM(5%) - N-VP (15%) | .004 | 5.2 | 66.2 | — |

[a]based on total monomer solution.
[b]solution pH adjusted to about 2.

It will be noted that most of the systems containing N-VP showed a dramatic increase in graft when copper was added to the system. This did not occur when the other monomer was methacrylamide, however. The reason for the difference in behavior of this compound and acrylamide is not apparent, since both 2-hydroxyethyl acrylate and 2-hydroxyethylmethacrylate showed dramatic increases in co-polymerization grafting with N-vinyl-2 - pyrrolidone when cupric ion was added to the system.

The increase in graft when cupric or ferric salts are used in the co-polymeriation grafting of N-vinyl-2 1 pyrrolidone and certain other monomers contrasts sharply with results obtained in certain other radiation grafting experiments. See, for example, Huglin and Johnson, *Journal of Polymer Science*, Part A-1, Vol. 7, p. 1379 (1969), "Role of Cations in Radiation Grafting and Homopolymerization." These authors studied the radiation grafting of acrylic acid on nylon. They found that while the salts decreased the homopolymerization, i.e., the gelling of the external solution, this "practical advantage" was at the expense of reduced graft.

In the present grafting system the advantages of both increased graft and liquid external polymer are obtained while retaining a sufficiently high water content in the graft layer for biocompatibility.

What is claimed is:

1. In a method for radiation grafting hydrogels onto an organic substrate selected from the group consisting of silicone rubber, polyurethane, polyvinyl chloride, and polyurethane-polyether copolymers wherein the substrate is immersed in an aqueous polymer graft solution and thereafter subjected to ionizing radiation, the improvement comprising adding an amount of cupric or ferric ions within the concentration range of 0.0008 M to 0.0016 M to an aqueous graft solution consisting of N-vinyl-2-pyrrolidone monomer or mixtures of N-vinyl-2-pyrrolidone and a second monomer selected from the group consisting of 2-hydroxyethyl acrylate, 2-hydroxyethyl methacrylate, propylene glycol acrylate, acrylamide, methacrylic acid, and methacrylamide, wherein the N-vinyl-2-pyrrolidone constitutes from 1/20 to 18/20 by volume of said mixture, said aqueous graft solution comprising a total monomer content in the range of 4 to 40% by volume.

2. A process as defined in claim 1 wherein said second monomer comprises 2-hydroxyethyl acrylate.

3. A process as defined in claim 1 wherein said second monomer is 2-hydroxyethyl methacrylate.

4. A process as defined in claim 1 wherein said cupric ions are incorporated as a soluble metal salt selected from the group consisting of cupric nitrate and cupric chloride.

5. A process as defined in claim 1 wherein said ionizing radiation is gamma radiation.

6. A process as defined in claim 5 wherein said gamma radiation is provided at a radiation dose of about 0.25 Megarads.

7. A process as defined in claim 1 wherein said ferric ions are incorporated as ferric nitrate.

* * * * *